United States Patent
Nau

(10) Patent No.: US 11,988,128 B2
(45) Date of Patent: May 21, 2024

(54) METHOD AND PROCESSOR UNIT FOR OPERATING AN EXHAUST GAS BURNER

(71) Applicant: Robert Bosch GmbH, Stuttgart (DE)

(72) Inventor: Michael Nau, Dornhan/Aischfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/718,618

(22) Filed: Apr. 12, 2022

(65) Prior Publication Data

US 2022/0333518 A1 Oct. 20, 2022

(30) Foreign Application Priority Data

Apr. 14, 2021 (DE) ...................... 10 2021 203 678.3

(51) Int. Cl.
| | | |
|---|---|---|
| *F01N 3/20* | (2006.01) | |
| *F01N 3/32* | (2006.01) | |
| *F01N 3/36* | (2006.01) | |
| *F01N 3/38* | (2006.01) | |
| *F01N 9/00* | (2006.01) | |

(52) U.S. Cl.
CPC ........... *F01N 3/2033* (2013.01); *F01N 3/204* (2013.01); *F01N 3/32* (2013.01); *F01N 3/36* (2013.01); *F01N 3/38* (2013.01); *F01N 9/00* (2013.01); *F01N 2900/1818* (2013.01)

(58) Field of Classification Search
CPC .... F01N 2610/1493; F01N 3/32; F01N 3/025; F01N 2240/14; F01N 3/2033
See application file for complete search history.

(56) References Cited

U.S. PATENT DOCUMENTS

| | | | | |
|---|---|---|---|---|
| 4,987,738 A | * | 1/1991 | Lopez-Crevillen | ..... F01N 3/025 60/303 |
| 2009/0223212 A1 | * | 9/2009 | Hoffman | .................. F01N 13/08 60/299 |
| 2017/0234196 A1 | * | 8/2017 | Ulrey | ...................... F01N 9/002 60/274 |

FOREIGN PATENT DOCUMENTS

| | | |
|---|---|---|
| DE | 4132814 A1 | 4/1993 |
| DE | 19504208 A1 | 8/1995 |
| DE | 102014108878 A1 | 12/2015 |
| KR | 102130371 B1 * | 7/2020 |

OTHER PUBLICATIONS https://dieselnet.com/tech/dpf_sys_burner.php (Year: 2020).*

(Continued)

*Primary Examiner* — Anthony Ayala Delgado
(74) *Attorney, Agent, or Firm* — Michael Best & Friedrich LLP

(57) ABSTRACT

A method (200) for operating an exhaust gas burner (120) in an exhaust section (102) of an internal combustion engine (110), comprising introducing a purging fluid comprising at least air (20) into the exhaust gas burner (120) during a purging operating phase (205), which lies outside the time of a normal operating phase (201) of the exhaust gas burner (120), and discharging a discharge mixture formed using the purging fluid from the exhaust gas burner (120), wherein the exhaust gas burner (120) is operated for the purpose of heating a component (130, 150) of the exhaust section (102) to its operating temperature during the normal operating phase (201). A processor unit (140) and a computer program for carrying out such a method (200) are furthermore proposed.

11 Claims, 2 Drawing Sheets

(56) References Cited

OTHER PUBLICATIONS

Reif, Editor, "Bosch Technik furs Leben: Abgastechnik fur Verbrennungs-motoren", 2015, ebook, pp. 99-100 (5 pages including statement of relevance).

* cited by examiner

METHOD AND PROCESSOR UNIT FOR OPERATING AN EXHAUST GAS BURNER

BACKGROUND OF THE INVENTION

The present invention relates to a method for operating an exhaust gas burner, and to a processor unit and a computer program for carrying it out.

To meet legally prescribed emissions limits, it is possible to use three-way catalytic converters (TWCs), which enable the relevant gaseous pollutants NOR, HC and CO to be converted into harmless products such as $N_2$, $H_2O$ and $CO_2$. In order for these catalytic reactions to proceed as intended, the temperatures in the catalytic converter must generally exceed what is referred to as the light-off temperature, typically 300-400° C. As soon as this has been reached or exceeded, the catalytic converter almost completely converts the relevant pollutants ("catalyst window").

In order to achieve this state as quickly as possible, catalyst heating measures can be employed within the engine. In this case, the efficiency of the spark-ignition engine is lowered by retarded ignition angles, and in this way the exhaust gas temperature and the enthalpy input to the catalytic converter are increased. At the same time, combustion stability can be ensured by means of adapted injection strategies (e.g., multiple injections).

In addition to these catalyst heating measures within the engine, it is also possible to employ external catalyst heating measures, for example by means of electrically heatable catalytic converters or exhaust gas burners. Such external heating measures are described in DE 41 32 814 A1 and DE 195 04 208 A1, for example.

SUMMARY OF THE INVENTION

According to the invention, a method for operating an exhaust gas burner and a processor unit and a computer program for carrying it out are proposed with the features of the independent patent claims. Advantageous embodiments form the subject matter of the dependent claims and of the following description.

The invention prevents or reduces the formation of condensate, carbon deposits or soot in the exhaust gas burner, during operating phases of the internal combustion engine in which the exhaust gas burner is not used for heating the exhaust section, by purging and/or thermally regenerating the combustion space of the exhaust gas burner. It is thereby possible to ensure stable, rapid and low-emission starting and operation of the exhaust gas burner. In particular, precise open-loop or closed-loop control of the exhaust gas burner in respect of air and fuel mass flow can be ensured through the prevention or removal of impurities in the exhaust gas burner.

It is thus possible to improve the use of exhaust gas burners, which have proven to be an extremely effective measure for reducing emissions in comparison with conventional operation using heating measures within the engine, particularly in the case of cold starts, that is to say high loads on the internal combustion engine in the cold state without an idling phase, in order to accelerate TWC light-off.

More specifically, a method according to the invention for operating an exhaust gas burner in an exhaust section of an internal combustion engine comprises introducing a purging fluid comprising at least air into the exhaust gas burner during a purging operating phase, which lies outside the time of a normal operating phase of the exhaust gas burner, and discharging a discharge mixture formed using the purging fluid from the exhaust gas burner, wherein the exhaust gas burner is operated for the purpose of heating a component of the exhaust section to its operating temperature during the normal operating phase. Owing to purging operation, a counterflow to a resulting flow of exhaust gas from the exhaust gas section into the exhaust gas burner can be produced, as a result of which condensable or already condensed components of the exhaust gas are transported out of the exhaust gas burner.

Advantageously, the internal combustion engine is not fired during the purging operating phase. If the internal combustion engine is not fired, even oxygen additionally introduced by purging operation does not significantly change the air flowing through the exhaust system. In particular, such phases in which the internal combustion engine is not fired can comprise overrun fuel cut-off phases, coasting phases or even, for example in the case of (plug-in) hybrid vehicles (PHEV), phases in which drive energy is provided by an electric machine connected in parallel with the internal combustion engine.

In some embodiments or in some purging operating phases, the purging fluid can additionally comprise fuel and be ignited in the burner. In this way, in addition to removal of impurities involving only fluid mechanics, it is also possible to achieve thermal regeneration, the impurities being at least partially removed by oxidation and condensed water also being evaporated. In such embodiments, a normal operating phase differs from the purging operating phase, in particular with regard to a prevailing component temperature. For example, in the case of burner operation at a catalytic converter temperature as component temperature below the light-off temperature, which can be, for example, 400° C., 300° C. or 250° C., a normal operating phase can be assumed, and at a catalytic converter temperature above these values, a purging operating phase can be assumed. In such cases, in which the purging fluid also comprises fuel, purging operation may also be referred to as thermal regeneration. Thermal regeneration can also take place while the internal combustion engine is being fired, since it is also possible to control the exhaust gas burner here in order to produce a controlled exhaust gas mixture. In other words, in thermal regeneration phases, in contrast to purging operating phases in which only air is used as the purging fluid, there is not necessarily an excess of oxygen in the exhaust section downstream of the exhaust gas burner. As a result, the lambda value of the total exhaust-gas mass flow (comprising the exhaust-gas mass flow of the internal combustion engine and that of the exhaust gas burner) can still be regulated to lambda=1, thus enabling the desired three-way pollutant conversion reaction (CO and HC oxidation and $NO_x$ reduction) to continue to proceed in an optimum manner.

The frequency and/or duration of the purging operating phase(s) are/is preferably determined as a function of an operating parameter of the exhaust gas burner determined during the normal operating phase. It is thereby possible to take into account an actual requirement for removal of impurities from the exhaust gas burner.

In particular, the operating parameter of the exhaust gas burner here comprises one or more from the group comprising a burner lambda adaptation value, a flame stability and an inflammation reliability. These are particularly informative indicators of the purging requirement.

Various sensor signals can be evaluated in order to assess flame stability and/or inflammation reliability. In particular, in the event of the formation of a flame in the exhaust gas burner, the sensor signal of a lambda probe indicates a drop in oxygen in the exhaust gas of the exhaust gas burner, and therefore a drop below a threshold value of, for example, lambda=1.8 can be used as a threshold value for determining the formation of a flame, for example. A curve of the pressure difference in the combustion air path from upstream of the exhaust gas burner to downstream of the exhaust gas burner or of the air mass flow (which is typically measured upstream of the exhaust gas burner) exhibits a rise in signal fluctuation amplitude when a flame is produced. A corresponding threshold value of the signal fluctuation amplitude can therefore be 50 hPa, for example. A temperature of the exhaust gas of the exhaust gas burner rises significantly if a flame is formed, and therefore a threshold value for a gradient of the temperature curve of at least 500 K/s or a threshold value for the temperature of 500° C. can be selected for this purpose, for example.

In the event of extinction of a flame in the exhaust gas burner, on the other hand, the lambda signal indicates a rise in oxygen in the exhaust gas of the exhaust gas burner, and therefore a threshold value of lambda=1.8 must be undershot in order to determine extinction of a flame, for example. This threshold value need not be identical to the threshold value for determining the formation of a flame; it is also possible to provide a hysteresis. In such a case, the curve of the pressure difference or of the air mass flow in the combustion air path from upstream of the exhaust gas burner to downstream of the exhaust gas burner exhibits a drop in signal fluctuation amplitude, and therefore a threshold value of the signal fluctuation amplitude of 50 hPa must be undershot for this purpose, for example. In this case, too, the threshold value for determining the extinction of the flame need not be identical to the threshold value for determining the formation of a flame; it is also possible to provide a hysteresis. The temperature of the exhaust gas of the exhaust gas burner, on the other hand, decreases, and therefore a gradient of −200 K/s or a threshold value for the temperature of 400° C. can be used as a threshold value for determining extinction of a flame, for example.

To assess flame stability and/or inflammation reliability, a threshold value for a number of extinctions during a predetermined period of time or a threshold value for a period of time from an ignition of the exhaust gas burner to detection of a flame can accordingly be used, for example.

Advantageously, a quantity and/or composition of the purging fluid can be taken into account in controlling a storage level of an exhaust gas catalytic converter downstream of the exhaust gas burner. Particularly in the case of three-way catalytic converters, an oxygen level is subjected to open-loop or closed-loop control, for example. This is crucial for simultaneous conversion of nitrogen oxides $NO_x$ (lean gas component) and carbon monoxide CO and hydrocarbons HC (rich gas components). Conventionally, the composition and quantity of the exhaust gas of the internal combustion engine are monitored and included in the open-loop or closed-loop level control of the catalytic converter. Such level control processes can be based, in particular, on an untreated emission model and/or a catalytic converter model and, for example, can balance an oxygen input (e.g., unused oxygen due to lean operation of the internal combustion engine or oxygen due to air pumped through the internal combustion engine during overrun fuel cut-off phases) against oxygen consumption in the catalytic converter (e.g., by oxidation of rich gas components). The inclusion of the quantity and composition of the purging fluid introduced into the catalytic converter during the purging operating phases accordingly prevents negative effects of these purging operating phases on the emissions behavior downstream of the catalytic converter and thus contributes overall to a reduction in pollutant emissions.

A processor unit according to the invention, e.g., a control unit of a motor vehicle, is designed, in particular in terms of program technology, to carry out a method according to the invention.

The implementation of a method according to the invention in the form of a computer program or computer program product with program code for carrying out all method steps is also advantageous since this gives rise to particularly low costs, especially if an executing control unit is also used for other tasks and is therefore present anyway. Suitable data carriers for providing the computer program are, in particular, magnetic, optical and electrical memories, such as hard disks, flash memories, EEPROMs, DVDs and the like. It is also possible to download a program via computer networks (Internet, intranet, etc.).

BRIEF DESCRIPTION OF THE DRAWINGS

Further advantages and embodiments of the invention will become apparent from the description and the accompanying drawing.

The invention is illustrated schematically in the drawing by means of exemplary embodiments and is described below with reference to the drawing.

DETAILED DESCRIPTION

Figure 1:
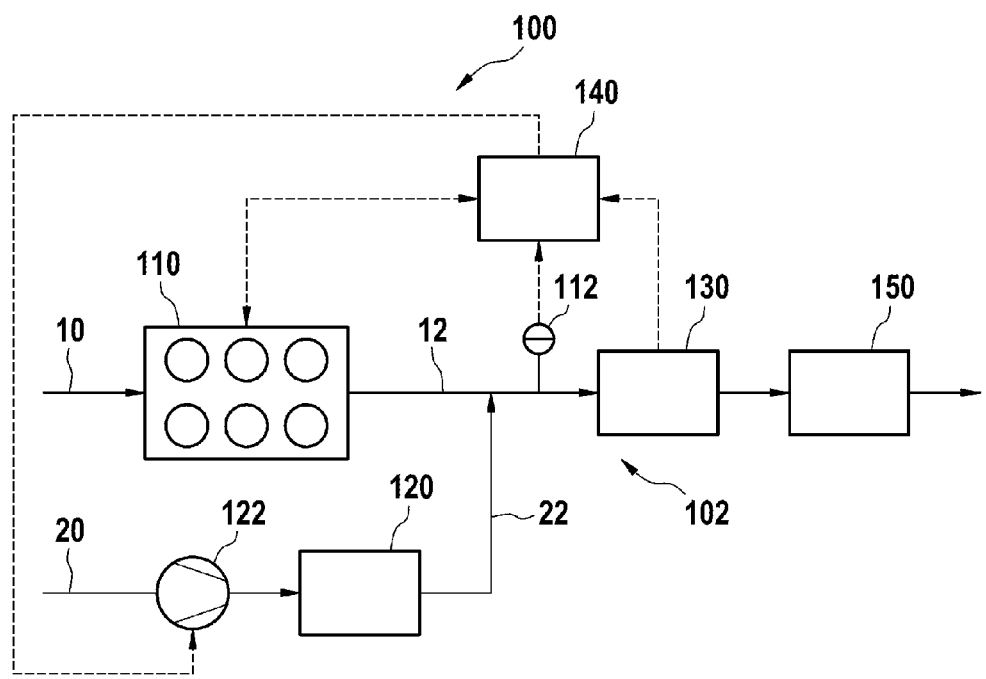
FIG. 1 shows an arrangement with an internal combustion engine, an exhaust gas burner and an exhaust gas catalytic converter, of the kind that can be used in the context of a method according to the invention.

FIG. 1 schematically illustrates an arrangement 100 which can be used, for example, in a vehicle, having an internal combustion engine 110 and an exhaust gas aftertreatment system 102.

The internal combustion engine 110 can be embodied in the form of a spark-ignition engine, a diesel engine and/or a Wankel or rotary piston engine, for example. A lean-burn engine with applied ignition can also be used as the internal combustion engine 110.

The exhaust gas aftertreatment system 102 is arranged downstream of the internal combustion engine 110 and comprises at least one catalytic converter 130 and an exhaust gas burner 120.

The exhaust gas 22 of the exhaust gas burner 120 is combined downstream of the internal combustion engine 110 with the exhaust gas 12 of the latter. This combination takes place upstream of the at least one catalytic converter 130 since the latter has in each case to be brought to a minimum necessary operating temperature before an operating phase. In terms of implementation, it is furthermore possible to provide valves for opening and closing the junction.

The catalytic converter 130 can comprise a three-way catalytic converter, for example (for spark-ignition engines; e.g., $NO_x$ storage catalytic converter or oxidation catalytic converter for diesel engines). Provision can furthermore be made for further similar and/or other catalytic converters and/or filter systems 150, for example soot particle filters, to be integrated into the exhaust gas aftertreatment system 102. It is also possible to combine a plurality of different catalyst types in a single multi-functional catalytic converter, as is customary, for example, in a three-way catalytic converter.

In the following, the general mode of operation of the exhaust gas burner 120 in a normal operating mode will first be explained with reference to an example in which an exhaust gas 22 of the burner 120 is fed to the catalytic converter 130 in order to heat it to operating temperature.

At the start of operation of the internal combustion engine 110, or in other situations in which heating of the exhaust gas aftertreatment system 102 is necessary, air is fed to the exhaust gas burner 120 via a secondary air system 20, and fuel is injected and ignited. For this purpose, a secondary air pump 122 and other components of the exhaust gas burner 120 are controlled by a processor unit 140 of the arrangement 100, e.g., a control unit of the vehicle. Typically, the operation of the burner 120 is also controlled and/or monitored by the control unit 140 after it has started, in particular using sensor signals, for example of a sensor 112, which can be arranged downstream of the burner 120 in the exhaust gas aftertreatment system. The sensor may, in particular, be a lambda probe, a temperature sensor, a mass flow sensor, a pressure sensor or else a plurality of such and/or other measuring instruments.

The exhaust gas 22 of the burner 120 which is introduced into the catalytic converter 130 heats the latter and is also converted by the latter (at least after a minimum temperature has been reached), with the result that pollutants are converted into less harmful exhaust gas constituents. Typically, however, the exhaust gas of an exhaust gas burner is relatively low in pollutants compared to exhaust gases of internal combustion engines, and therefore conversion need not be absolutely required. If a switch-off condition is reached, for example a predetermined temperature is reached in the catalytic converter 130, the control unit 140 controls the exhaust gas burner to terminate the normal operating mode, in particular the secondary air pump 122 and the fuel supply to the exhaust gas burner 120 are switched off for this purpose.

Outside the normal operating phase of the burner, there will conventionally be no fluid flow from the exhaust gas burner 120 into the exhaust gas aftertreatment system 102. On the other hand, exhaust gas constituents may be transported or diffused into the exhaust gas burner from downstream of the exhaust gas burner as a result of pulsations (cylinders) and diffusion. As a result, exhaust gas components of the exhaust gas 12 of the internal combustion engine 110, e.g., water or soot particles, may be deposited in the exhaust gas burner. In order to counteract this, in the context of a method according to the invention, a purging fluid is directed into the exhaust gas burner 120 at least temporarily during purging operating phases, which do not overlap in time with the normal operating phases just described. In some embodiments, the purging fluid can consist of air taken from the secondary air system 20. In such embodiments, during the purging operating phase, contaminants introduced into the exhaust gas burner from downstream are discharged with the introduced secondary air in the direction of the exhaust gas aftertreatment system 102.

The control unit 140 can coordinate these purging operating phases, such that these are carried out, for example, only in phases in which the internal combustion engine 110 is not being fired, that is to say is switched off.

Such a purging operating phase with air can be provided during a run-down of the internal combustion engine 110 (for example after the ignition has been switched off when the internal combustion engine 110 is still in motion) and/or after the internal combustion engine 110 has been switched off or has stopped.

Such a purging operating phase can either be activated each time the internal combustion engine 110 runs down or is switched off, or only when one of the activation criteria explained below occurs. Furthermore, this mode of operation with air is advantageous during overrun fuel cut-off phases or coasting phases of the internal combustion engine 110 as well as during phases with purely electric drive in hybrid vehicles or PHEVs. In such operating phases, the internal combustion engine 110, insofar as it is (still) in motion, typically functions as an air pump which conveys air 10 from upstream of the internal combustion engine 110 into the exhaust gas aftertreatment system 102, and thus in any case brings about oxygen saturation of the exhaust gas aftertreatment system 102.

In particular, provision can be made for the purging operating phases to be controlled as a function of further influencing variables. During a normal operating phase of the exhaust gas burner 120, it is possible, for example, to monitor how stably a flame is burning in the exhaust gas burner 120 and, in the event of indications of unstable flame behavior, a purging operating phase can be initiated after the normal operating phase, and/or its frequency and/or duration can be set accordingly.

Depending on the urgency with which the purging requirement is demanded via the activation criteria (see below), the purging operation can take place during the entire overrun fuel cut-off or coasting phase or in the majority of the purely electric driving mode, or just in correspondingly smaller proportions.

In alternative or additional embodiments, the purging fluid can also comprise fuel and can be ignited in the exhaust gas burner, enabling the exhaust gas burner to be burned out, in particular in order to evaporate condensed water and/or in order to remove already solidified soot deposits at least partially by oxidation.

Such selective burner operation, even during the operation of the internal combustion engine 110 ("thermal regeneration"), even after the exhaust gas aftertreatment system 102 has been heated above the light-off temperature of the catalytic converter 130, can likewise be activated in accordance with the criteria described below.

Figure 2:
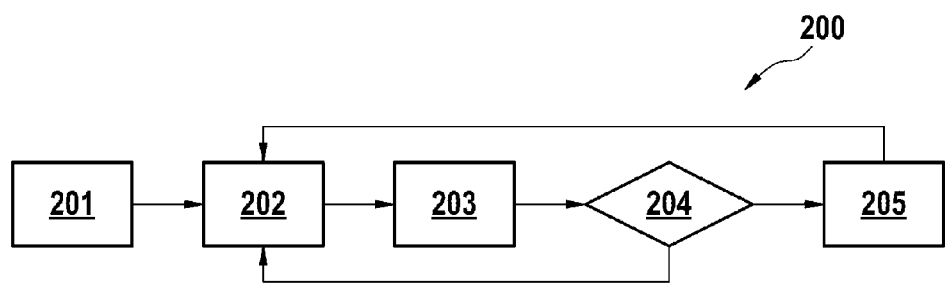
FIG. 2 shows an advantageous embodiment of a method according to the invention in the form of a greatly simplified flow chart.

In summary, an advantageous embodiment of such a method is also shown schematically in FIG. 2 and designated overall by 200.

In a first step 201 of the method 200, the exhaust gas burner 120 is operated in a normal operating mode in order to heat the catalytic converter 130 of the exhaust gas aftertreatment system 102. During this normal operating phase 201 of the burner, operating parameters of the burner 120 which provide information, for example, about flame stability, reliability of inflammation and/or controllability of the burner 120 are monitored or detected.

From the values determined in this way, a purging requirement for the exhaust gas burner 120 is determined in a step 202, on the basis of which requirement a frequency and/or an intensity of purging operating phases is specified in a step 203.

In a step 204, which is carried out when the normal operating phase 201 has ended, that is to say, in particular, after a minimum temperature has been reached in the catalytic converter 130, a check is made as to whether switch-on conditions are present for a purging operating phase. In particular, the switch-on conditions can be assessed as present when no load is currently being demanded by the internal combustion engine 110. This may be the case, for example, in overrun fuel cut-off or coasting phases, or alternatively when ignition of the internal combustion engine 110 has been switched off manually (key stop) or in operating phases in which an electric machine takes over the driving power (e.g., hybrid electric vehicles). In particular, purging operating phases with pure air as the purging fluid and thermal regeneration phases have different switch-on conditions. As already explained, air can only be used as the purging fluid when the internal combustion engine 110 is not being fired (restrictive condition), whereas thermal regeneration can also take place in operating phases with the internal combustion engine 110 being fired. However, a disadvantage of thermal regeneration phases is fuel consumption. Therefore, air is preferably used as the purging fluid, while thermal regeneration is only carried out if there is an additional indication (e.g., inadequate flame stability in the exhaust gas burner, etc.).

If the switch-on conditions are assessed as present in step 204, the method 200 continues with a purging operating or thermal regeneration phase of the kind already described in detail above. In this process, the intensities and/or frequencies determined in step 203 are taken into account, particularly in respect of duration and/or purging fluid quantity of such a purging operating phase. The method can then return to step 202 in order, if appropriate, to allow for the purging operating phase that has taken place in the further purging requirement.

If, on the other hand, it is ascertained in step 204 that the switch-on conditions are not present, the method 200 can return directly to step 202 in order to take into account the time during which the exhaust gas burner 120 is not purged when determining the purging requirement.

As already mentioned, criteria by means of which the frequency and intensity of the purging operating or thermal regeneration phases can be determined in step 203 will now be proposed.

On the one hand, it is proposed to activate the burner purging or thermal regeneration process if the values of a so-called burner lambda mixture adaptation overshoot or undershoot a certain threshold value. Using the magnitude of this overshoot, the frequency and intensity of the purging operating or thermal regeneration phases can then be determined.

The approach of burner lambda mixture adaptation is also described below with reference to FIG. 3 and is expressly part of the present invention.

Figure 3:
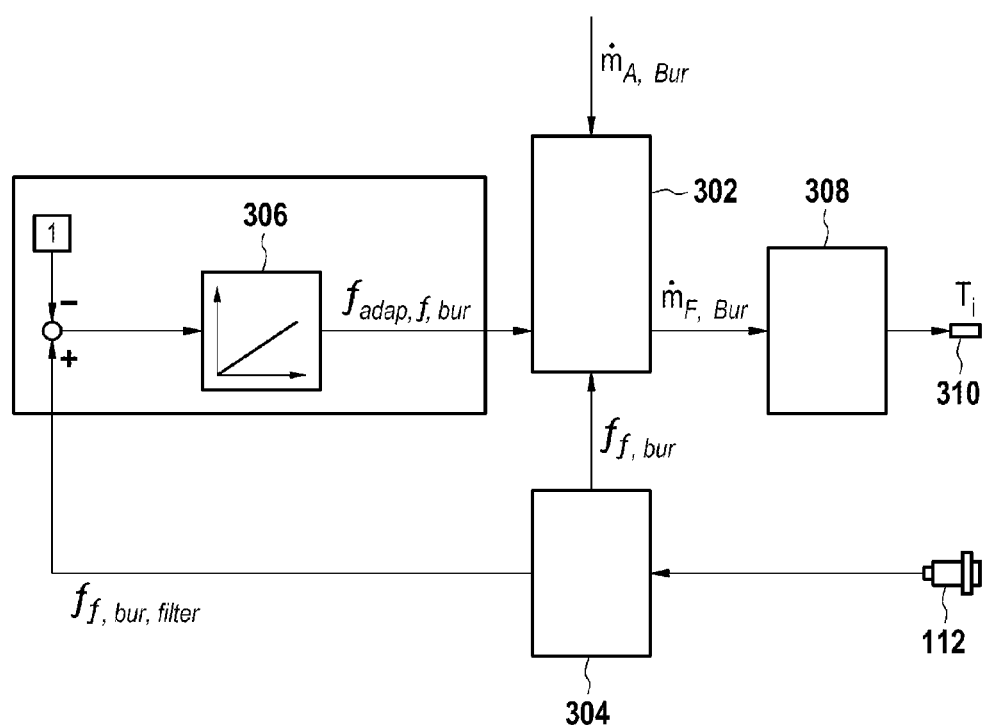
FIG. 3 schematically shows one possibility for determining a purging requirement, of the kind that can be used in conjunction with advantageous embodiments of a method according to the invention.

FIG. 3 schematically illustrates one possibility for burner lambda mixture adaptation, which can be used to determine a purging requirement according to advantageous embodiments of the method according to the invention.

The air/fuel ratio (=λ or lambda) of both the burner 120 and the internal combustion engine 110 massively influences the respective untreated emissions ($NO_x$, HC, CO).

In this case, for example, the burner lambda is defined as:

$$\lambda_{Bur} = \dot{m}_{A,Bur}/\dot{m}_{F,Bur}/L_{st}$$

In this case, $\dot{m}_{A,Bur}$ represents the air mass flow fed to the burner 120, $\dot{m}_{F,Bur}$ represents the fuel mass flow fed to the burner 120 and $L_{st}$ represents the stoichiometric air requirement of the burner 120.

Here, the air ratio lambda of the internal combustion engine 110 $\lambda_{BKM}$ is defined in an analogous manner.

In addition, the two lambda values mentioned, weighted with the respective exhaust gas mass flows $\dot{m}_{Exh}$, determine the mixture lambda downstream of the combination of the two exhaust gases 12, 22.

$$\lambda_{mix} = \lambda_{mix}(\lambda_{BKM}, \lambda_{Bur}, \dot{m}_{Exh,Bur})$$

This mixture lambda, in turn, must be subjected to very accurate (feedforward) control or feedback control—typically very close to λ=1 in the case of a three-way catalytic converter 130 for a spark-ignition engine—as soon as the catalytic converter 130 reaches the minimum temperature required for conversion (referred to as the "light-off temperature").

Since the intervention can take place more dynamically via the burner fuel path than via the burner air path 20, access of the controller 304 to the fuel path $\dot{m}_{F,Bur}$ as the manipulated variable, e.g., in the form of a correction factor $f_{f,bur}$, is preferred here.

This results in the corrected fuel mass flow $\dot{m}_{F,Bur}$ as $$\dot{m}_{F,Bur} = f_{f,bur} \cdot \dot{m}_{A,Bur}/\lambda_{Exh,Bur/mix,soll}/L_{st}$$

The aforementioned lambda adaptation is now based on the following considerations:

According to the procedure just explained, the lambda controller 304 corrects the burner lambda deviations "rapidly". Such deviations from the lambda feedforward control 302 are caused by tolerances/errors in the burner air path 20 (e.g., pressure sensor or air mass (HFM) tolerances, geometric component tolerances, leaks, . . . ) and in the fuel path (delay times and flow tolerances of the injection system 310, fluctuating fuel densities, . . . ). Some of the aforementioned sources of error change only slowly over time and can therefore be adapted to reduce the burden on the lambda controller 304. It is thereby possible to achieve smaller burner lambda deviations, inter alia even in dynamic burner operation, but also in operating states in which the lambda probe 112 is not yet ready for control.

Such an adaptation method can calculate an adaptation factor $f_{adap,f,Bur}$, on the basis of a filtered (e.g., PT1) fuel correction factor $f_{f,Bur,filter}$ by means of a "slow" integrator or I controller 306. This is then used for correcting the fuel mass flow $\dot{m}_{F,Bur}$ or an injection output $T_i$ and thus reduces or relieves the actual control intervention via $f_{f,Bur}$:

$$\dot{m}_{F,Bur} = f_{adap,f,Bur} \cdot f_{f,Bur} \cdot \dot{m}_{A,Bur}/\lambda_{Exh,Bur,soll}/L_{st}$$

Instead of a multiplicative adaptation factor, an additive offset correction or a combination of the two approaches is also conceivable. These adaptation values (factor and/or offset) can also be determined/adapted and stored, for example, as a function of the burner power, the burner lambda, the outside temperature or other relevant input variables. These stored adaptation values are thus immediately available again when the system is restarted.

As mentioned at the outset, the magnitude of this or these adaptation values will now be used to determine the frequency and intensity of the purging operating or thermal regeneration phases.

In addition to the adaptation values of the lambda closed-loop control which have just been described, it is also possible, within the scope of the present invention, to use characteristic variables which characterize the quality and speed of burner starting as influencing variables for setting the frequency and intensity of the purging or thermal regeneration phases mentioned.

As already described at the outset, the following variables can be evaluated for this purpose:

Pressure fluctuations at the burner 120: for burner charge detection, (differential) pressure sensors can be used at the burner. For rapid detection of inflammation, use is made of the fact that the pressure fluctuations increase significantly as combustion operation begins.

Air mass meter at the burner 120 or in the secondary air system 20: for rapid detection of inflammation, use is made of the fact that the fluctuations of the sensor signal increase significantly as combustion operation begins.

Lambda signal downstream of the exhaust gas burner 120: as combustion begins, the oxygen content is drastically reduced. The curve measured by means of the lambda probe is an indication of burner starting speed and quality.

Burner exhaust gas temperature sensor downstream of the burner 120: the curve of the exhaust gas temperature or gradient provides information about successful starting of combustion.

From the curve of these variables, critical threshold values or patterns can be derived or learned. Depending on the degree to which they are overshot, the frequency and intensity of the purging operating or thermal regeneration phases can then be determined.

In addition, an approach is proposed below as to how the effect of purging operation of the exhaust gas burner 120 on what is referred to as the oxygen reservoir of the catalytic converter 130 can be taken into account.

In addition to the catalytic effect on $NO_x$ reduction and CO and HC oxidation, a three-way catalytic converter is typically provided with an oxygen-storing component. When the filling level is "reasonable" (not too full and not too empty), it has the effect that, in the case of lean excursions of the exhaust gas 12 of the internal combustion engine 110, $NO_x$ reduction can still take place and, in the case of rich excursions of the exhaust gas 12, CO and HC oxidation can still take place.

In this case, fundamentally different approaches for determining the filling level of the oxygen reservoir and for achieving what is referred to as oxygen balance control are possible. For this purpose, however, these models require, inter alia, the air or oxygen mass flow entering the catalytic converter 130. The air mass flow which the internal combustion engine 110 introduces into the catalytic converter 130 in the overrun operation phases can be determined via the ECU models or charge sensors.

Within the scope of the present invention, it is proposed to add to this air mass flow the contribution of the burner air mass flow during the purging operating phases and thus to take it correctly into account in its effect on the expanded oxygen balance control. This can be determined via models of the charge detection for the burner 120 (e.g., throttle equation) or charge sensors (air mass meter, pressure sensors upstream of/downstream of/around the burner).

The invention has been explained here using the example of the burner exhaust gas inlet upstream of the catalytic converter 130. In the case of an embodiment of the exhaust gas aftertreatment system 102 with a further catalytic converter 150, these explanations can be applied mutatis mutandis to the burner exhaust gas inlet upstream of the further catalytic converter 150 (not illustrated in the figure). This is expressly part of the present invention.

Likewise, analogous application of the statements to multi-flow exhaust systems (e.g., V6, V8, . . . ) and, in general, to internal combustion engines with different numbers of combustion chambers is possible and likewise forms part of this invention.

It should furthermore be emphasized that the above description of the method 200 in the form of a step-by-step procedure is intended to serve only for better understanding and the method according to the invention does not have to resort to such a step-by-step procedure in all embodiments. It is also possible for some steps to be carried out in a different, for example reverse, sequence or in a combined or integrated manner or to be omitted altogether without departing from the scope of the present invention.

The invention claimed is:

1. A method (200) for operating an exhaust gas burner (120) in an exhaust section (102) of an internal combustion engine (110), the method comprising:
    introducing a purging fluid comprising at least air (20) into the exhaust gas burner (120) during a purging operating phase (205), which lies outside a time of a normal operating phase (201) of the exhaust gas burner (120), and
    discharging a discharge mixture (22) formed using the purging fluid from the exhaust gas burner (120),
    wherein the exhaust gas burner (120) is operated for a purpose of heating at least one component (130, 150) of the exhaust section (102) to its operating temperature during the normal operating phase (201),
    wherein the exhaust gas burner (120) is configured to be in fluid communication with the exhaust section (102) of the internal combustion engine (110), and
    wherein a parameter of the purging operating phase is determined (203) as a function of an operating parameter of the exhaust gas burner (120) determined during the normal operating phase (201).

2. The method (200) according to claim 1, wherein the internal combustion engine (110) is not fired during the purging operating phase (205).

3. The method (200) according to claim 1, wherein the purging fluid does not comprise fuel.

4. The method (200) according to claim 1, wherein the purging fluid additionally comprises fuel and is ignited in the exhaust gas burner (120).

5. The method (200) according to claim 1, wherein the internal combustion engine (110) is fired during the purging operating phase (205) and wherein the purging fluid additionally comprises fuel and is ignited in the exhaust gas burner (120).

6. The method (200) according to claim 1, wherein the parameter of the purge operating phase includes at least one of a frequency or a duration of the purging operating phase.

7. The method (200) according to claim 6, wherein the operating parameter of the exhaust gas burner (120) comprises one or more from the group comprising a burner lambda adaptation value, a flame stability and an inflammation reliability.

8. The method (200) according to claim 1, wherein a quantity and/or composition of the purging fluid is taken into account in controlling a storage level of an exhaust gas catalytic converter (130) downstream of the exhaust gas burner (120).

9. The method (200) according to claim 1, wherein the at least one component (130, 150) of the exhaust section (102) has a temperature during the purging operating phase (205) that is not be-low a minimum operating temperature or light-off temperature of the at least one component (130, 150).

10. A processor unit (140) which is configured to control and an exhaust gas burner (120) in an exhaust section (102) of an internal combustion engine (110), to:

introduce a purging fluid comprising at least air (20) into the exhaust gas burner (120) during a purging operating phase (205), which lies outside a time of a normal operating phase (201) of the exhaust gas burner (120), and discharge a discharge mixture (22) formed using the purging fluid from the exhaust gas burner (120), wherein the exhaust gas burner (120) is operated for a purpose of heating at least one component (130, 150) of the exhaust section (102) to its operating temperature during the normal operating phase (201), wherein the exhaust gas burner (120) is configured to be in fluid communication with the exhaust section (102) of the internal combustion engine (110), and wherein a parameter of the purging operating phase is determined (203) as a function of an operating parameter of the exhaust gas burner (120) determined during the normal operating phase (201).

11. A non-transitory, computer-readable storage medium containing instructions that when executed by a computer cause the computer to control and an exhaust gas burner (120) in an exhaust section (102) of an internal combustion engine (110), to:

introduce a purging fluid comprising at least air (20) into the exhaust gas burner (120) during a purging operating phase (205), which lies outside a time of a normal operating phase (201) of the exhaust gas burner (120), and discharge a discharge mixture (22) formed using the purging fluid from the exhaust gas burner (120), wherein the exhaust gas burner (120) is operated for a purpose of heating at least one component (130, 150) of the exhaust section (102) to its operating temperature during the normal operating phase (201), wherein the exhaust gas burner (120) is configured to be in fluid communication with the exhaust section (102) of the internal combustion engine (110), and wherein a parameter of the purging operating phase is determined (203) as a function of an operating parameter of the exhaust gas burner (120) determined during the normal operating phase (201).

* * * * *